United States Patent [19]

Haendle

[11] Patent Number: 4,618,976
[45] Date of Patent: Oct. 21, 1986

[54] X-RAY DIAGNOSTIC INSTALLATION

[75] Inventor: Joerg Haendle, Erlangen, Fed. Rep. of Germany

[73] Assignee: Siemens Aktiengesellschaft, Berlin & Munich, Fed. Rep. of Germany

[21] Appl. No.: 630,674

[22] Filed: Jul. 13, 1984

[30] Foreign Application Priority Data

Sep. 7, 1983 [DE] Fed. Rep. of Germany ....... 3332317

[51] Int. Cl.$^4$ .............................................. H05G 1/64
[52] U.S. Cl. ....................................... 378/99; 358/111
[58] Field of Search ........................... 358/111; 378/99

[56] References Cited

U.S. PATENT DOCUMENTS 4,064,530 12/1977 Kaiser et al.
4,204,226 5/1980 Mistretta ............................. 358/111
4,444,196 4/1984 Stein .................................... 358/111
4,514,759 4/1985 Amtmann ............................ 358/111
4,543,604 4/1985 Grosse.

FOREIGN PATENT DOCUMENTS 3215552 10/1983 Fed. Rep. of Germany.

OTHER PUBLICATIONS

Electronic Radiography in X-Ray Diagnosis during Surgical Procedures, Haendle et al., Electromedica, (English Edition), No. 2, 1981, pp. 74–79.
Computer Angiography–Intravenous Arteriography, Baert et al., Electromedica, (English Edition), No. 2, 1981, pp. 122–131.
Digital Subtraction Angiography (DSA): Diagnostic Importance and Risk, Seyferth et al., Electromedica, (English Edition), No. 2, 1982, pp. 60–68.

Primary Examiner—Craig E. Church
Assistant Examiner—Charles Wieland
Attorney, Agent, or Firm—Hill, Van Santen, Steadman & Simpson

[57] ABSTRACT

For angiographic X-ray examinations with an image intensifier-television installation, three image memories are connected to a control generator which in respective clock pulse intervals cyclically places a respective one of the image memories in the write state for the purpose of storage of a current video signal which is averaged over several images. A subtraction device for the subtraction of image data occurring at various times receives the current video signal and the output signal of the one image memory in the write state. Connected to the subtraction device is a maximum detector which recognizes the maximum of the contrast medium flow and in response thereto actuates the control generator to cause the image memory which was last in the write state, and the image memory with the chronologically oldest video signal to be switched to the read state and to produce a difference signal for display on a video display based on the readout from such image memories.

5 Claims, 5 Drawing Figures

X-RAY DIAGNOSTIC INSTALLATION

BACKGROUND OF THE INVENTION

The invention relates to an X-ray diagnostic installation for angiographic X-ray examinations, comprising an image intensifier-television installation, at least one image memory, a subtraction device for the subtraction of image data occurring at various times, and a monitor, in which the current video signal and a video signal representing an averaging of several images in the image memory are supplied to the subtraction device, in which a maximum detector is connected to the subtraction device, which detector recognizes the maximum of the contrast medium flow, and wherein the maximum detector is connected to the image memory for initiating the storage of an image taken with an optimum amount of contrast medium present. Subtraction images find use in the case of fluoroscopic examinations, particularly in the case of selective angiography, in order to make blood vessels clearly visible which, in the normal radiograph, can be poorly recognized or on which bone structures are superimposed.

In the case of the X-ray diagnostic installation of the initially cited type according to the German Pat. No. 3,215,552 corresponding to U.S. Pat. No. 4,543,604, a mask corresponding to a radiograph without contrast agent, which may be termed an empty image, can be read into a second image memory under manual control, or automatically by means of a detector. Subsequently, a video signal averaged over several images can be continuously read into the first image memory. Through subtraction of this stored video signal from the current video signal the maximum of the contrast agent flow is detected by the maximum detector which then terminates the storage so that an image remains permanently stored in the first image memory which corresponds with the presence of a desired density of contrast medium and which may be termed a filling image. In the case of manual triggering to initiate the storage of an empty (non-contrast medium-filled) image pursuant to visual control, conditioned by the reaction time of the observer and by the minimum recognizability of the rise of the contrast medium density, the taking of an empty image radiograph at the optimum time can be achieved only in rare instances. Moreover, with regard to a possible movement of the patient, the radiographic time of the empty image radiograph must lie as closely as possible before the rise of the contrast agent density.

In order to avoid these difficulties a detector for the automatic detection of the empty image is described in the aforementioned German patent in which the average video signal is likewise subtracted from the current video signal. If the difference signal exceeds a threshold value, the detector causes an empty image to remain permanently stored in a second image memory. However, the problem occurring here is that, given a movement of the patient already prior to the injection of the contrast medium or during the injection, due to the injection shock, the detector can respond to this. On the other hand, using the detection means described in the German patent, the maximum of the contrast medium flow, on account of its strong change, can be satisfactorily determined.

SUMMARY OF THE INVENTION

Other background information relevant to the subject matter described herein can be found in "Electronic Radiography in X-ray Diagnosis during Surgical Procedures," Haendle et al, *Electromedica* (English Edition), No. 2, 1981, pages 74–79; "Computer Angiography-Intravenous Arteriography," Baert et al, *Electromedica* (English Edition), No. 2, 1981, Pages 122–131; and "Digital Subtraction Angiography (DSA): Diagnostic Importance and Risk," Seyferth et al, *Electromedica* (English Edition), No. 2, 1982, pages 60–68.

The invention proceeds from the objective of producing an X-ray diagnostic installation of the initially cited type in which the storage of an empty (non-contrast medium-filled) image proceeds at an optimum time.

In accordance with the invention the objective is achieved in that at least two additional image memories are present, that the image memories are connected to a control generator which at desired clock pulse intervals cyclically switches one of the image memories to the writing state for the purpose of storage of the current video signal averaged over several images, that there is supplied, to the subtraction device, the output signal of the image memory which is disposed in the write state, that the maximum detector is connected to the control generator and controls the latter in such a fashion that, upon occurrence of the maximum, the image memory, which was last in the write state, and the image memory with the chronologically oldest video signal, are switched to the read state, and the thus-formed difference signal is represented. Through this memory arrangement, it is possible that, in addition to the optimum filling image recognized by the maximum detector, at least two further contrast medium images are stored, one of which corresponds with the rise of the contrast medium density as a function of time and the other, represents a condition before the rise of the contrast agent density. The latter contrast medium image represents an optimum empty image, and is subtracted from the filling image.

A particularly advantageous embodiment with few components is obtained if two multiple change-over switches are connected to the image memories which switches are actuated by the control generator, if two subtraction devices are connected to the change-over switches, if the first change-over switch connects the image memory which is in the write state with one input of the two subtraction devices, the current video signal being supplied to the first subtraction device at the other input for the purpose of detection of the maximum, and if the second change-over switch connects the image memory with the oldest video signal to the other input of the second substraction device. The processing circuit can be adapted to any contrast medium progression (time function) if adjustment means for the duration of the clock pulse intervals are arranged on the control generator. Interfering influences due to patient movement can be avoided if a movement detector is connected to the first subtraction device, which movement detector generates a control signal for the X-ray diagnostic installation. A simple construction is achieved if the movement detector has a threshold value circuit which, corresponding to a positive or negative change, generates output signals which are added separately in two post-connected summation stages and supplied to an evaluation circuit.

The invention shall be explained in greater detail in the following on the basis of an exemplary embodiment illustrated on the accompanying drawing sheets; and other objects, features and advantages will be apparent from this detailed disclosure and from the appended claims.

DETAILED DESCRIPTION

Figure 1:
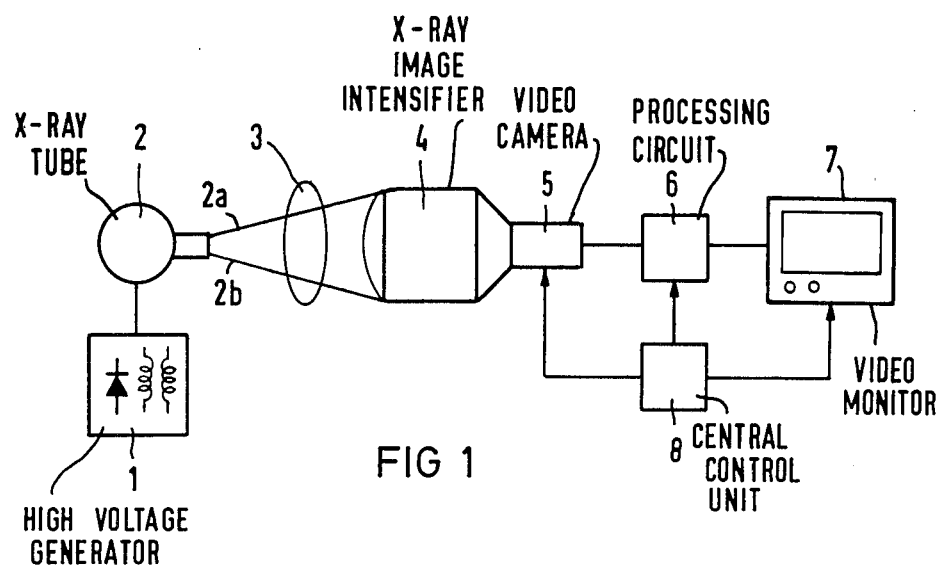
FIG. 1 is a diagram showing an X-ray diagnostic installation according to the invention.

In FIG. 1, an X-ray tube 2 which is operated by a high voltage generator 1 is illustrated which emits a radiation beam (indicated by marginal rays 2a and 2b) which penetrates the patient 3 and projects a radiation image on the input fluorescent screen of an X-ray image intensifier 4. The output image of the X-ray image intensifier 4 is picked up by a television camera 5 to which a processing circuit 6 for the purpose of subtraction is connected whose output signal is represented on the monitor 7. A central unit 8 controls the synchronisation of the signal generation of the television camera and of the signal processing operations of the processing circuit 6 and of the monitor 7.

Figure 2:
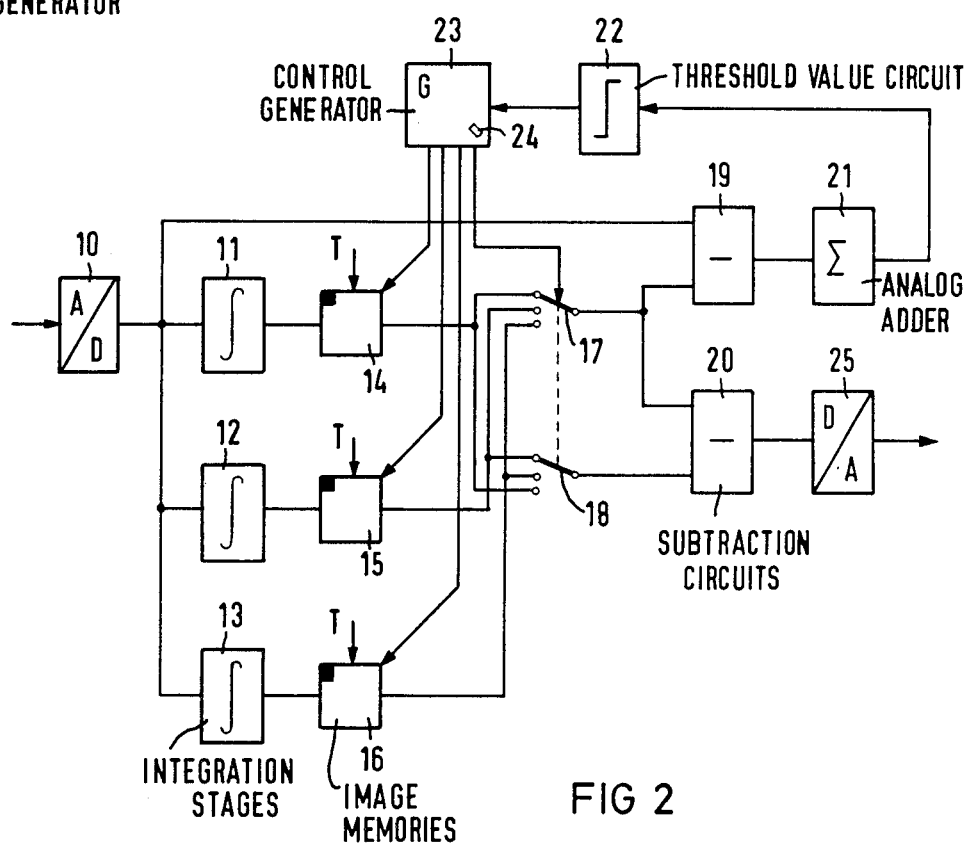
FIG. 2 shows a block circuit diagram of the processing circuit of FIG. 1.

In FIG. 2, an embodiment of the processing circuit 6 illustrated in FIG. 1 is described. A video signal from the television camera 5 is supplied to an analog-to-digital converter (A/D converter 10). The A/D converter 10 is connected to three integration stages 11, 12 and 13 to which repectively image memories 14, 15 and 16 are connected. In addition, the clock pulses of the central unit 8 are supplied to the image memories 14, 15 and 16 for controlling entry of data therein as described, for example, in the aforementioned U.S. Pat. No. 4,543,604. The outputs of the image memories 14, 15 and 16 are connected to two triple change-over switches 17 and 18 whose switch positions at the input side are coupled together with one another. The first image memory 14 is connected to the first switching contact of the change-over switch 17 and to the third switching contact of the change-over switch 18. The second image memory 15 is connected to the second switching contact of the change-over switch 17 and to the first switching contact of the change-over switch 18. The output of the third image memory 16 occupies the third switching contact of the change-over switch 17 and the second switching contact of the change-over switch 18.

The change-over switch 17 is connected to two subtraction devices 19 and 20. The current video signal from the A/D converter 10 is additionally supplied to a second input of the subtraction device 19. The difference signal of the subtraction device 19 is summed in an analog adder 21 in image-point fashion and is supplied to a threshold value circuit 22, for example, a Schmitt trigger whose output is connected to a control generator 23. The control generator 23 is connected via control lines to the image memories 14, 15 and 16 and to the change-over switches 17 and 18. An adjuster 24 is associated with the control generator 23 for manually adjusting the duration of the write state and the read state, respectively, of the image memories 14, 15 and 16 and for correspondingly adjusting the switching cycle of the change-over switches 17 and 18.

The second input of the subtraction device 20 is connected to the change-over switch 18. The output of the subtraction device 20 is connected to a digital-to-analog converter (D/A converter 25) whose output signal is represented on the monitor 7.

The control generator 23 switches the image memories 14, 15 and 16 to the write state in cyclical succession while the two remaining image memories can be read out. In the illustrated position of the change-over switches 17 and 18, the current video signal is integrated in the integrator 11 and read into the first image memory 14. In the subtraction device 19 the current video signal and the integrated video signal contained in the first image memory 14 are compared through difference formation. After expiration of the duration of the clock pulse interval selected by the adjuster 24, the changeover switches 17 and 18 are switched to their second position, the first image memory 14 is switched to the read state and the second image memory 15 is switched to the write state. In the next clock pulse cycle, the change-over switches 17 and 18 are in their third position and the video signal is now read into the third image memory 16. The contents can be read out from the two remaining image memories 14 and 15.

In the subtraction device 19, the current video signal and the video signal which is integrated over several images in one of the image memories 14 through 16 are compared with one another. As long as no contrast medium has as yet been injected both signals are similar except for the noise component so that the summation signal of the analog adder 21 amounts to approximately zero. If a contrast medium now appears in the region picked up by the television camera 5 then, due to the continuing rise of the contrast medium density, the sum signal is greater than zero. If then the maximum is obtained, the sum signal drops to zero, and then becomes negative in the further course of the summation with the decrease in the contrast medium density. This is recognized by the threshold value circuit 22 which delivers a signal to the control generator 23, whereupon the latter immediately switches the image memory, which at that time is in the write state, to the read state. Also, the further switching (or stepping) of the change-over switches 17 and 18 is stopped so that their last-present switching position is maintained.

Through the wiring of the change-over switches 17 and 18, the output signals of two image memories are respectively supplied to the subtraction device 20, whose difference signal is visible on the monitor 7. After switching on of the storage phase of the image memories 14 through 16 first the video signal is read into the image memory 14. Subsequently, the image memories 15 and 16 are successively switched to the write state. If the clock pulse interval for the third image memory 16 has expired, the first image memory 14 is again switched to the write state. During the first clock pulse interval, the video signal of the second image memory 15, which still amounts to zero directly after switching-on, is subtracted from the video signal of the first image memory 14. During the second clock pulse interval, there is subtracted, from the contents of the second image memory 15, the contents of the third image memory 16 in which likewise no image is as yet contained. During the third clock pulse interval, the contents of the first image memory 14 is subtracted from the contents of the third image memory 16. This signifies that the oldest video signal contained in the image memories is subtracted from the current integrated video signal. This state which arises after two clock pulse intervals is maintained during the entire storage phase.

If, after the rise of the contrast medium density, its maximum is attained and exceeded, the storage operation is stopped, all image memories 14–16 are switched to the read state, and the change-over switches 17 and 18 maintain their last-assumed switching position. If the position, illustrated in FIG. 2, were to correspond to this situation this means that, upon occurrence of the maximum, the integrated video signal was last read into the first image memory 14 so that the image contained in said first image memory 14 would correspond to the optimum filling image. In the third image memory 16, in which storage was previously carried out, an image is contained which was stored during the rise of the contrast medium density. The chronologically oldest video signal in the second image memory 15 was read-in, given a corresponding selection of the duration of the clock pulse interval, prior to the rise of the contrast medium density. This image thus corresponds to an optimum empty image. Thus, in the subtraction device 20, the optimum empty image, which is determined from the final position of the change-over switches 17 and 18, is subtracted from the optimum filling image so that a subtraction image with great contrast is displayed on the monitor 7.

Figure 3:
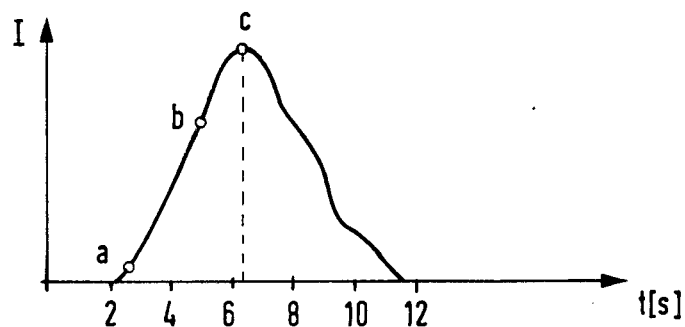
FIGS. 3 and 4 show curves representing various contrast medium progressions as a function of time.
Figure 4:
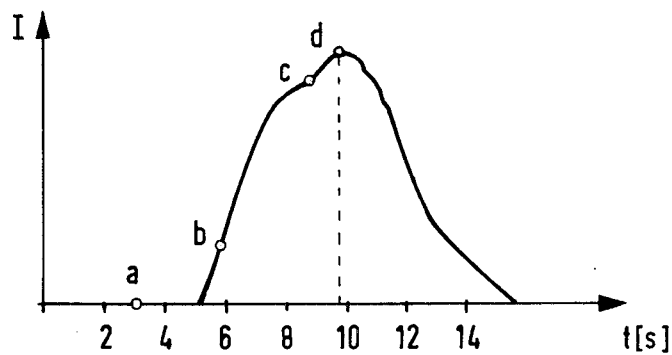

On the basis of FIGS. 3 and 4, in which possible progressions of the contrast medium density as a function of time are illustrated, the method of operation of the storage of the empty image and of the filling image is explained in yet further detail. The contrast medium progression illustrated in FIG. 3 could, for example, correspond to that of a pelvic artery. The examining physician sets the duration of the clock pulse interval by means of the adjuster 24, for example, to 2.5 seconds. Now, during the first 2.5 seconds, in the integration stage 11, the video signal is integrated, for example, over sixteen successive images, and the integrated image is written into image memory 14. After expiration of the first clock pulse interval of 2.5 seconds, a video signal is contained in the first image memory 14 which corresponds to the integration of the last sixteen images (point a on the curve of FIG. 3). Next, the second image memory 15 is switched to the write state in which, after expiration of the 2.5 second clock pulse interval, a video signal is likewise contained which corresponds to the integration of the last sixteen images of the video signal (point b in FIG. 3). After the fifth second, the third image memory 16 is switched to the write state into which the current video signal integrated through the integration stage 13 is read. After exceeding the maximum which, in FIGS. 3 and 4 is represented by the dash vertical line, all image memories 14 through 16 are switched to read state. In the third image memory 16, a video signal is now contained which corresponds to the integration of the last sixteen images which all lie closely before or behind the maximum of the contrast medium progression (point c in FIG. 3). Through the last-assumed switching position of the change-over switches 17 and 18, which are in their third switching position, the video signal (represented at a in FIG. 3) contained in the first image memory 14, which video signal corresponds to an empty image, is subtracted from the video signal (c) contained in the third image memory 16, which video signal corresponds to the filling image, and the difference signal is displayed via the D/A converter 25 on the monitor. Instead of a duration of the clock pulse interval of 2.5 seconds, however, given a sufficiently great advance, a greater duration of the clock pulse interval can also be selected. However, the smaller the selected value, the closer the empty images and filling images lie next to one another so that movements of the patient cannot have an interfering effect.

In FIG. 4, a further possible contrast medium progression as a function of time is illustrated in which the precursory period, i.e., the time without contrast medium is greater. In this case, the duration of the clock pulse interval selected by means of the adjuster 24 can, for example, amount to three seconds. The video signal occurring during the first three seconds is integrated and read into the first image memory 14. The video signal of the second clock pulse interval, which extends from three to six seconds, is read into the second image memory 15 in an integrated fashion. Thus, after expiration of the second clock pulse interval, a video signal is contained in the second image memory 15 which corresponds to the integration of the last sixteen images of the video signal which are characterized by the point b in FIG. 4. During the next clock pulse interval from six to nine seconds, the integrated video signal is read into the third image memory 16 in which, after termination of the clock pulse interval, a video signal is stored which corresponds to the density of the contrast medium indicated at point c in FIG. 4. The fourth clock pulse interval which commences after nine seconds, is again read into the first image memory 14 in an integrated fashion. After recognition of the maximum of the contrast medium progression, a video signal is now contained in the first image memory 14 which corresponds to a density of the contrast medium as represented by point d on the contrast medium progression of FIG. 4. The change-over switches 17 and 18 are again in the switching position illustrated in FIG. 2. After the occurrence of the maximum there is thus subtracted, from the video signal (point d) contained in the first image memory, the video signal (point b) contained in the second image memory 15. A difference signal with high contrast is thereby obtained.

Through a better selection of the duration of the clock pulse interval or through the utilization of an additional image memory, for example, it is possible for the empty image, in any case, to be provided at a time which lies before the rise of the contrast agent density. If, for example, in the case illustrated in FIG. 4, a clock pulse interval of four seconds were to be selected, the maximum would fall into the third clock pulse interval and the empty image would be obtained in any case, before the rise of the contrast agent. If, on the other hand, a fourth image memory were to be provided and the changeover switches 17 and 18 were to consist of quadruple-changeover switches then, given the same duration of the clock pulse interval of three seconds, the empty image (point a) would be subtracted from the filling image (point d) so that it would also hereby be guaranteed that the empty image, in any case, is obtained before the rise of the contrast agent progression.

From these examples explained on the basis of FIGS. 3 and 4, it can be recognized that, pursuant to utilization of three image memories, the clock pulse duration must be greater than half and smaller than the rise time of the contrast medium density. In the case of the example illustrated in FIG. 3, this would signify that, given a rise time (point b, FIG. 3) of approximately 4.5 seconds, the clock pulse duration must lie between 2.25 and 4.5 seconds.

Figure 5:
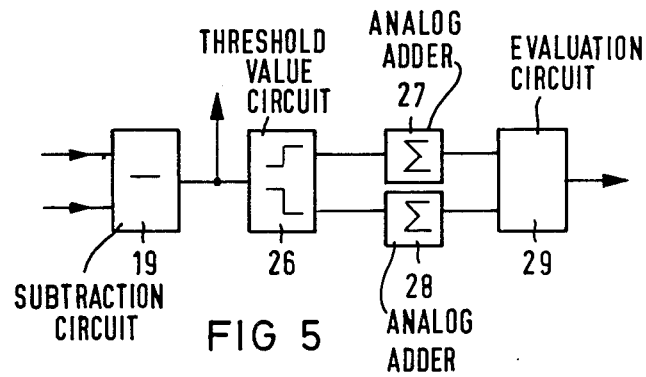
FIG. 5 shows a block circuit diagram of a movement detector.

If movements of the patient occur during the examination, the examination result can become erroneous and unuseable. In order to recognize such a movement and to suppress the following interferences therefrom, the processing circuit can exhibit a movement detector 26 to 29, such as illustrated in FIG. 5. This movement detector of FIG. 5 is connected, together with the analog adder 21, to the first subtraction device 19. As input circuit, it exhibits a threshold value circuit 26 which subdivides the output signal of the first subtraction device 19 into positive and negative values. If a positive value occurs, a signal is supplied to a second analog adder 27. If, by contrast, a negative value occurs, the threshold value circuit 26 delivers the signal to a third analog adder 28. Connected to both analog adders 27 and 28 is an evaluation circuit 29 which, upon occurrence of a movement, generates a control signal for the X-ray diagnostic installation.

With this construction of the movement detector 26 to 29 one proceeds from the consideration that, in the case of a subject movement in the image, positive as well as negative changes can arise. If, by contrast, a contrast medium flow occurs, either only a positive change or only a negative change arises. The evaluation circuit 29 thus recognizes whether the values of the positive and negative changes approximately equal one another. If this case occurs, a movement of the patient 3 has taken place and the evaluation circuit 29 generates the control signal. The evaluation circuit 29 can include a comparator in which only a number of the first bits is wired, whereas the smaller bits are suppressed. What is achieved thereby is that an equality within a range is recognized.

The control signal of the movement detector 26 to 29 can, for example, be employed for the purpose of having the contrast medium injection disconnected upon occurrence of a movement. The dose rate of the X-ray generator 1 can also be switched over through this control signal. The control signal, however, can also be employed for the immediate switching over of the image memories 14 to 16 into the write state. If, as integrator, a circuit which has become known from U.S. Pat. No. 4,064,530 is employed in which, in dependence upon a change in the television image, the weighting factors for the current video signal and the previously integrated video signal are altered, the control signal can be employed for switching-over the weighting factors. If a change occurs, only the current video signal reaches the output of the integrator in unattenuated form. If, by contrast, no change occurs any longer, the current video signal is increasingly attenuated and added to the portion of the stored video signal which is becoming increasingly larger. The control signal generated by the movement detector 26 to 29 thus can switch over such an integration stage so that it adapts itself more rapidly to the new video signal upon occurrence of a movement.

It will be apparent that many modifications and variations may be made without departing from the scope of the teachings and concepts of the present invention.

I claim as my invention:

1. An X-ray diagnostic system for angiographic X-ray examination of a patient after injection of a contrast medium, said system comprising:
   means for generating an X-ray beam directed at said patient;
   an image intensifier/television chain including an image intensifier on which said radiation is incident, a video camera having an input connected to an output of said image intensifier for generating video signals, a processing circuit connected to an output of said camera for receiving said video signals therefrom, a monitor connected to said processing circuit for displaying an image comprised of said video signals, and a central control unit for controlling the video camera, the processing circuit and the monitor;
   said processing circuit including at least three image memories, a control generator for generating clock pulses connected to said image memories for controlling entry of said video signals therein cyclically during respective clock pulse intervals by successively switching respective ones of the image memories to the right state for storing a current video signal averaged over several images therein, a first subtraction device to which the current video signal and the video signal for one image memory are supplied for forming a first difference video signal, a maximum detector connected to said first subtraction device for recognizing a maximum of the flow of said contrast medium in said patient and connected to the control generator for actuating said control generator for effecting storage of an image occurring at the maximum of said flow of said contrast medium, and a second subtraction device;
   said control generator controlling the image memories such that, upon occurence of said maximum, the image memory which was last in the right state, and the image memory with the chronologically oldest video signal, are switched to the read state and are connected to said second subtraction device for forming a second difference video signal; and
   said second subtraction device being connected to said monitor for displaying said second difference video signal.

2. An X-ray diagnostic installation as claimed in claim 1, further comprising first and second multi-pole switches each connected to said image memories and to said control generator for actuating said switches, said first and second subtraction devices being connected to said first and second switches such that the first switch connects the output of the image memory which is in the write state to one input of said subtraction device, the current video signal being supplied to the other input of said first subtraction device, and such that the second switch connects the output of the image memory with the oldest video signal to the other input of said second subtraction device.

3. An X-ray diagnostic installation as claimed in claim 1, further comprising adjustment means coupled with said control generator for adjusting the duration of said clock pulse intervals.

4. An X-ray diagnostic installation as claimed in claim 1, further comprising a detector for sensing movement of said patient connected to the output of said first subtraction device, said detector generating a signal for controlling said signal generator for effecting a selected response if patient movement is detected.

5. An X-ray diagnostic installation as claimed in claim 4, wherein said movement detector comprises:
   a first circuit for comparing the first difference video signal with selected threshold values, said first circuit generating respective separate output signals corresponding to a positive or negative change of the output signal of the first subtraction device; to summing stages connected to said first circuit for receiving the respective separate output signals and for adding the respective separate output signals to provide respective separate sum signals; and a second circuit connected to said summing stages for receiving the separate sum signals, said second circuit generating said control signal if the respective sums of said positive and negative changes are equal to a selected degree.

* * * * *